(12) United States Patent
Jernigan, IV et al.

(10) Patent No.: US 7,562,101 B1
(45) Date of Patent: Jul. 14, 2009

(54) BLOCK ALLOCATION TESTING

(75) Inventors: Richard P. Jernigan, IV, Ambridge, PA (US); Jason S. Bertschi, Pittsburgh, PA (US)

(73) Assignee: Network Appliance, Inc., Sunnyvale, CA (US)

( * ) Notice: Subject to any disclaimer, the term of this patent is extended or adjusted under 35 U.S.C. 154(b) by 478 days.

(21) Appl. No.: 10/857,700

(22) Filed: May 28, 2004

(51) Int. Cl.
G06F 17/30 (2006.01)
G06F 13/00 (2006.01)
G06F 11/00 (2006.01)

(52) U.S. Cl. .................. 707/200; 707/202; 711/154; 714/6; 714/799

(58) Field of Classification Search .............. 707/202, 707/200, 203, 204; 711/154, 161, 162, 170; 714/6, 764, 799
See application file for complete search history.

(56) References Cited

U.S. PATENT DOCUMENTS

| | | | | |
|---|---|---|---|---|
| 5,727,206 A * | 3/1998 | Fish et al. | ............... | 707/202 |
| 5,761,678 A * | 6/1998 | Bendert et al. | ............... | 707/204 |
| 5,771,379 A * | 6/1998 | Gore, Jr. | ............... | 707/101 |
| 5,778,411 A * | 7/1998 | DeMoss et al. | ............... | 711/4 |
| 5,784,699 A * | 7/1998 | McMahon et al. | ............... | 711/171 |
| 5,819,292 A * | 10/1998 | Hitz et al. | ............... | 707/203 |
| 5,828,876 A * | 10/1998 | Fish et al. | ............... | 707/1 |
| 5,875,444 A * | 2/1999 | Hughes | ............... | 707/2 |
| 5,963,962 A * | 10/1999 | Hitz et al. | ............... | 707/202 |
| 5,996,047 A * | 11/1999 | Peacock | ............... | 711/118 |
| 6,138,126 A * | 10/2000 | Hitz et al. | ............... | 707/202 |
| 6,289,356 B1 * | 9/2001 | Hitz et al. | ............... | 707/201 |
| 6,397,311 B1 * | 5/2002 | Capps | ............... | 711/165 |
| 6,636,879 B1 * | 10/2003 | Doucette et al. | ............... | 707/205 |
| 6,721,764 B2 * | 4/2004 | Hitz et al. | ............... | 707/202 |
| 6,829,617 B2 * | 12/2004 | Sawdon et al. | ............... | 707/102 |
| 6,938,134 B2 * | 8/2005 | Madany | ............... | 711/161 |
| 7,010,554 B2 * | 3/2006 | Jiang et al. | ............... | 707/205 |
| 7,043,503 B2 * | 5/2006 | Haskin et al. | ............... | 707/200 |
| 7,047,380 B2 * | 5/2006 | Tormasov et al. | ............... | 711/162 |
| 7,055,010 B2 * | 5/2006 | Lin et al. | ............... | 711/162 |
| 7,085,899 B2 * | 8/2006 | Kim et al. | ............... | 711/161 |
| 7,246,211 B1 * | 7/2007 | Beloussov et al. | ............... | 711/162 |

(Continued)

OTHER PUBLICATIONS

Demsky, Brian, et al., "Automatic Detection and Repair of Errors in Data Structures", OOPSLA '03, Anaheim, CA, Oct. 26-30, 1999, pp. 78-95.*

(Continued)

*Primary Examiner*—John E Breene
*Assistant Examiner*—Robert Stevens
(74) *Attorney, Agent, or Firm*—Blakely, Sokoloff, Taylor & Zafman LLP

(57) ABSTRACT

According to an embodiment of the invention, a block allocation testing method tests the allocation of blocks to make sure they are consistent. The method first establishes a ready volumes list, including all of the most downstream volumes in a storage pool. From the ready volumes list, an inode data list is generated. Inodes are then removed from the inode data list and processed. The block pointers in the inodes are tested one by one, and compared to the downstream pointers to determine whether the copy on write bit (CWB) is properly set. It is also determined whether there is any illegal crosslinking. Once it is determined whether the pointers of a single inode are proper, the process continues with the next inode in the list.

35 Claims, 14 Drawing Sheets

U.S. PATENT DOCUMENTS

| | | | | |
|---|---|---|---|---|
| 2002/0083037 | A1* | 6/2002 | Lewis et al. | 707/1 |
| 2002/0091670 | A1* | 7/2002 | Hitz et al. | 707/1 |
| 2003/0145199 | A1* | 7/2003 | Miller et al. | 713/161 |
| 2003/0182253 | A1* | 9/2003 | Chen et al. | 707/1 |
| 2003/0182313 | A1* | 9/2003 | Federwisch et al. | 707/200 |
| 2003/0182389 | A1* | 9/2003 | Edwards | 709/213 |
| 2004/0059878 | A1* | 3/2004 | Madany | 711/154 |
| 2004/0093474 | A1* | 5/2004 | Lin et al. | 711/162 |
| 2004/0268068 | A1* | 12/2004 | Curran et al. | 711/162 |
| 2005/0027956 | A1* | 2/2005 | Tormasov et al. | 711/162 |
| 2005/0065986 | A1* | 3/2005 | Bixby et al. | 707/204 |
| 2005/0066095 | A1* | 3/2005 | Mullick et al. | 710/200 |
| 2005/0228835 | A1* | 10/2005 | Roa | 707/204 |

OTHER PUBLICATIONS

Stevens, W. Richard, Advanced Programming in the UNIX Environment, Addison-Wesley, Reading MA, © 1992, pp. 92-95.*

Tomonori, Fujita, et al., "Protecting the Integrity of an Entire File System", IWIA '03, IEEE, Mar. 24, 2003, pp. 95-105.*

Soares, Livio B., et al., "Meta-data Snapshotting: A Simple Mechanism for File System Consistency", SNAPI '03, New Orleans, LA, Sep. 27-Oct. 1, 2003, pp. 1-12.*

Santry, Douglas S., et al., "Deciding When to Forget in the Elephant File System", SOSP-17, Kiawah Island, SC, Dec. 1999, pp. 110-123.*

Soules, Craig A. N., et al., "Metadata Efficiency in Versioning File Systems", Proceedings of FAST '03: The 2nd USENIX Conference on File and Storage Technologies, San Francisco, CA, Mar. 31-Apr. 2, 2003, pp. 43-58.*

Microsoft Computer Dictionary, 4th Edition, Redmond, WA, © 1999, p. 348.*

Trautman, Philip, "Scalability and Performance in Modern Filesystems", Silicon Graphics, Inc. © 2000, pp. 1-14.*

Peacock, J. Kent, et al., "Fast Consistency Checking for the Solaris File System", USENIX (NO98), New Orleans, LA, Jun. 1998, pp. 1-13.*

Aranya, Akshat, et al., "Tracefs: A File System to Trace Them All", FAST 2004, San Francisco, CA, Mar. 31-Apr. 2, 2004, pp. 1-15.*

Ganger, Gregory R., et al., "Soft Updates: A Solution to the Metadata Update Problem in File Systems", ACM Transactions on Computer Systems, vol. 18, No. 2, May 2000, pp. 127-153.*

Seltzer, Margo I., et al., "Journaling versus Soft Updates; Asynchronous Meta-data Protection in File Systems", Proceedings of the USENIX Technical Conference, Jun. 2000, pp. 1-14.*

Muniswamy-Reddy, Kiran-Kumar, et al., "A Versatile and User-Oriented Versioning File System", FAST 2004, San Francisco, CA, Mar. 31-Apr. 2, 2004, pp. 1-14.*

Mazières, David, et al., "Don't Trust Your File Server", Eighth Workshop on Hot Topics in Operating Systems, May 20-21, 2001, pp. 113-118.*

Hutchinson, Norman C., et al., "Logical vs. Physical File System Backup", USENIX: Proc. of the 3rd Symposium on Operating Systems Design and Implementation, New Orleans, LA, Feb. 1999, pp. 1-12.*

Microsoft Computer Dictionary, 5th Edition, Microsoft Press, Redmond, WA, @2002, pp. 212-213.*

* cited by examiner

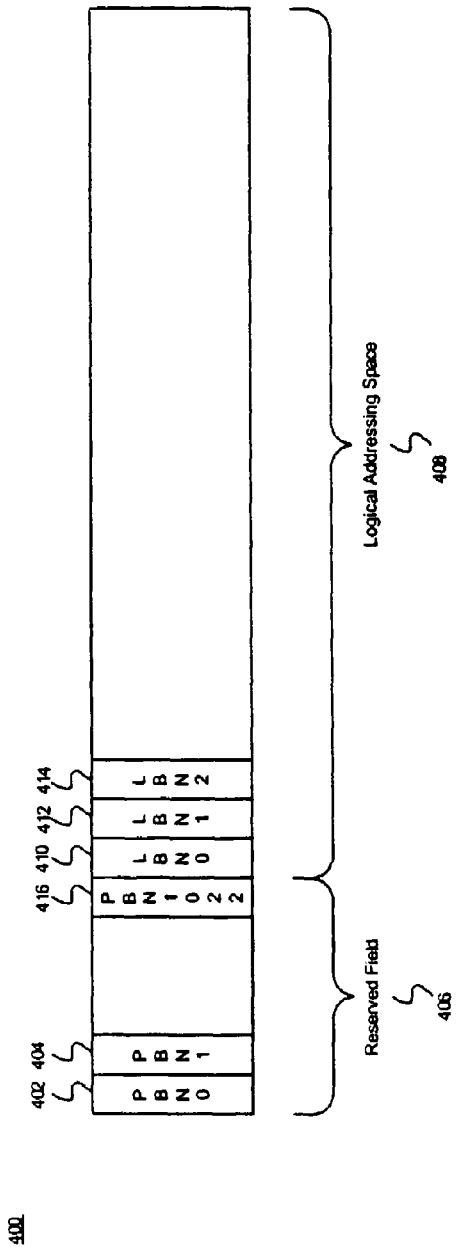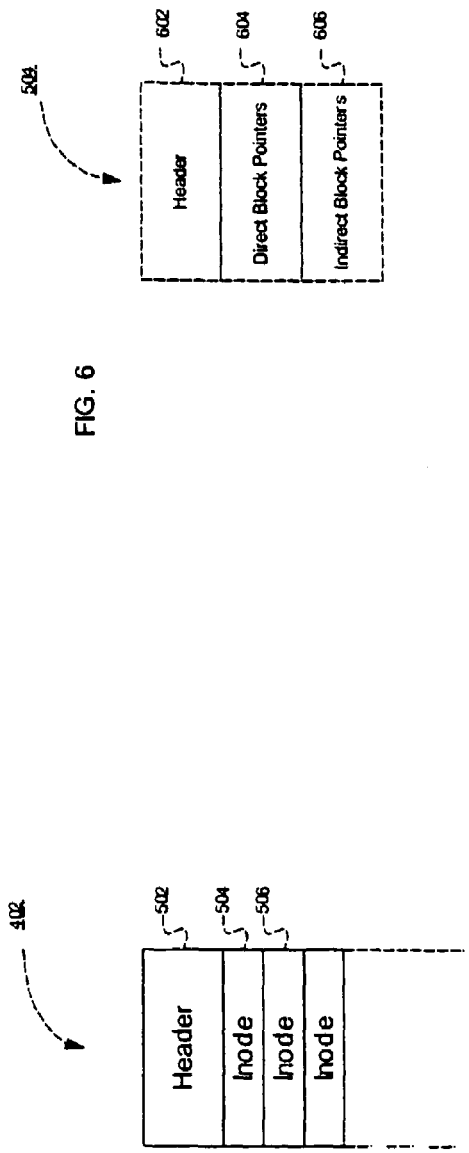

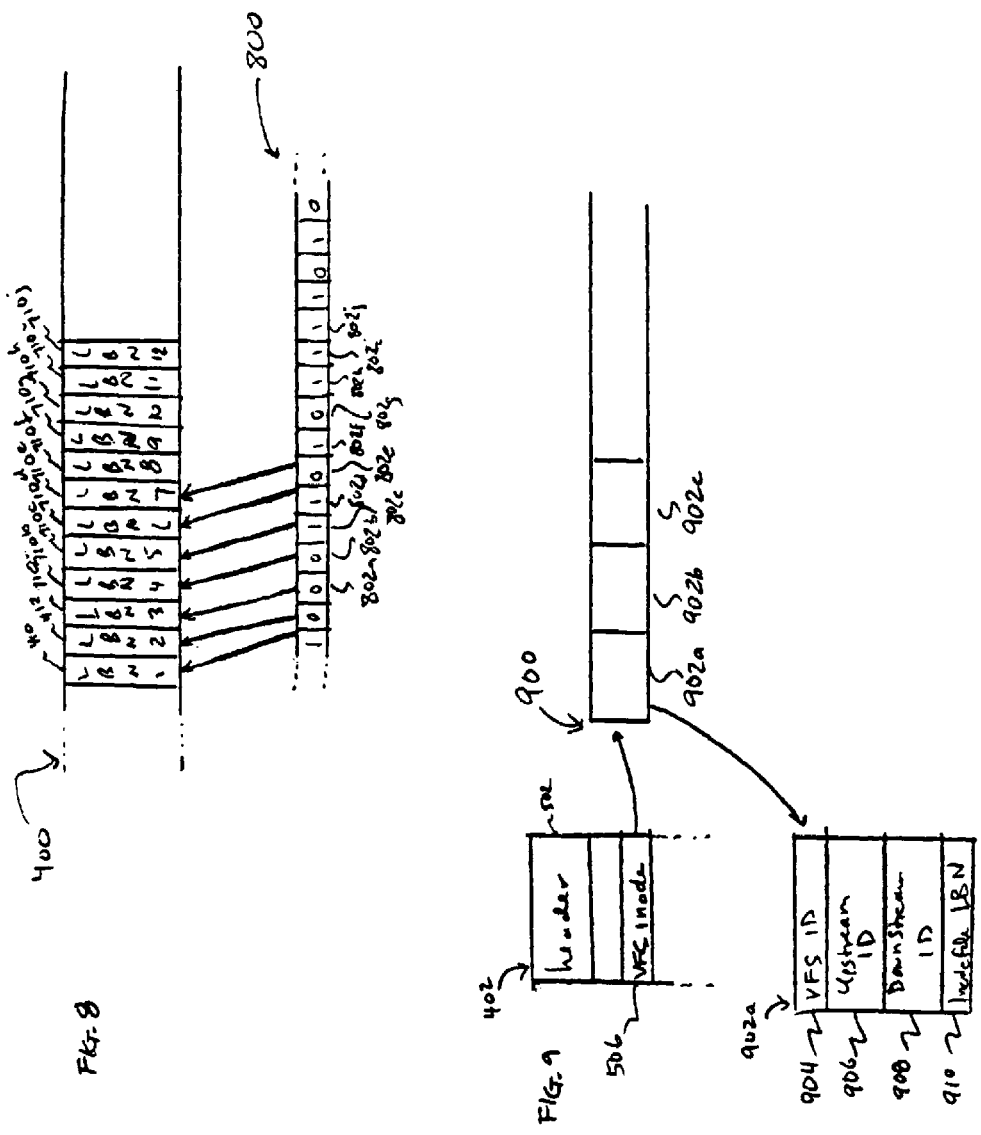

BLOCK ALLOCATION TESTING

FIELD OF THE INVENTION

The present invention generally relates to file systems and more specifically relates to testing the validity of data stored in a file system.

BACKGROUND

A file server is a type of storage server which operates on behalf of one or more clients to store and manage shared files in a set of mass storage devices, such as magnetic or optical storage based disks. The mass storage devices are typically organized as one or more groups of Redundant Array of Independent (or Inexpensive) Disks (RAID). One configuration in which file servers can be used is a network attached storage (NAS) configuration. In a NAS configuration, a file server can be implemented in the form of an appliance, called a filer, that attaches to a network, such as a local area network (LAN) or a corporate intranet. An example of such an appliance is any of the NetApp Filer products made by Network Appliance, Inc. in Sunnyvale, Calif.

An operating system (OS) is the software on a computing system or device such as a storage or file server that is used to control the basic functions of the system. The OS may include a file system to organize and perform operations on data stored on various storage devices, including magnetic and optical devices such as hard drives or compact disc read only memory (CD-ROMs). The file system typically manages the reading and writing of data on storage devices. The term "file system" may also refer to the stored data in its entirety. A file system typically includes tools to verify the accuracy of the stored data.

A file system may organize data stored on a storage device using any one of several techniques. According to one technique, the storage on the storage device is divided into 4-kilobyte (KB) blocks. The blocks are organized into a storage pool, and hold all of the data stored on the storage device, including the data needed to organize files and directories. A single file or other data structure can be represented by a data structure known as an inode. The inode includes block pointers that point to the location of the blocks for a file. The file system can find the locations of the data blocks that compose a specific file by determining the inode that corresponds to the file, and following the pointers in the inode to the blocks that store the data.

The allocation of the blocks is sometimes tested to make sure that each block is properly allocated and that pointers to the block are proper. This type of testing is particularly important in a storage server, such as a file server, which maintains large volumes of data on behalf of multiple clients. For example, the testing may determine that a block listed as being unused is in fact used. The testing is done to insure the integrity of the data stored on the storage device.

At least one previous method for testing block allocation allotted five bits for each block. The five bits formed a block record. Two bits of the record determined whether certain attributes had been set and the remaining three bits listed the usage of the block. The block records were all stored in memory, during which time the method tried to determine whether the allocation was proper.

Since storage devices may be very large, a computer system may not have enough memory to test all of the blocks at once. As a result, the storage pool on the computer system is divided into several different passes. While the scan of the file system is occurring, the storage is inaccessible. Therefore, it is advantageous to minimize the time required to perform the scan. What is needed is a method to reduce the amount of memory required per block during block allocation testing to reduce the number of passes required for testing, and thus to reduce the amount of time the storage is unavailable.

The previous testing method is also unable to test for certain kinds of conflicts. For example, the method cannot determine when there are two different pointers improperly pointing to the same block. Therefore, what is also needed is a way to more thoroughly test the allocation of the blocks.

SUMMARY OF THE INVENTION

The present invention includes a method for performing block allocation testing. In the method, an entry is removed from an inode data list. The entry includes a first inode and second inode downstream from the first inode if the second inode exists. A first block pointer is determined from the first inode. A second block pointer corresponding to the first block pointer is determined from the second inode. It is then determined whether a copy on write bit for the first block pointer is properly set by comparing the first block pointer to the second block pointer.

Other aspects of the invention will be apparent from the accompanying figures and from the detailed description which follows.

BRIEF DESCRIPTION OF THE DRAWINGS

One or more embodiments of the present invention are illustrated by way of example and not limitation in the figures of the accompanying drawings, in which like references indicate similar elements and in which:

FIG. 4 illustrates a storage pool according to an embodiment of the invention;

FIG. 5 illustrates the superblock;

FIG. 6 illustrates an inode;

FIG. 8 illustrates a bitmap allocation file;

FIG. 9 illustrates a vfsfile;

DETAILED DESCRIPTION

Described herein a method and apparatus for block allocation testing. Note that in this description, references to "one embodiment" or "an embodiment" mean that the feature being referred to is included in at least one embodiment of the present invention. Further, separate references to "one embodiment" or "an embodiment" in this description do not necessarily refer to the same embodiment; however, such embodiments are also not mutually exclusive unless so stated, and except as will be readily apparent to those skilled in the art from the description. For example, a feature, structure, act, etc. described in one embodiment may also be included in other embodiments. Thus, the present invention can include a variety of combinations and/or integrations of the embodiments described herein.

According to an embodiment of the invention, a block allocation testing method tests the allocation of blocks to make sure they are consistent. The method first establishes a ready volumes list, including all of the most downstream (the oldest in a related family) volumes in a storage pool. From the ready volumes list, an inode data list is generated. Inodes are then removed from the inode data list and processed. The block pointers in the inodes are tested one by one, and compared to the downstream pointers to determine whether the copy on write bit (CWB) for each pointer is properly set. It is also determined whether there is any illegal crosslinking. Once it is determined whether the pointers of a single inode are proper, the process continues with the next inode in the list. This approach requires only one bit of memory per block during the testing, rather than the five bits required by the previous implementation described above. As a result, many more blocks can be tested simultaneously, and the storage is unavailable for a much shorter period of time.

Figure 1:
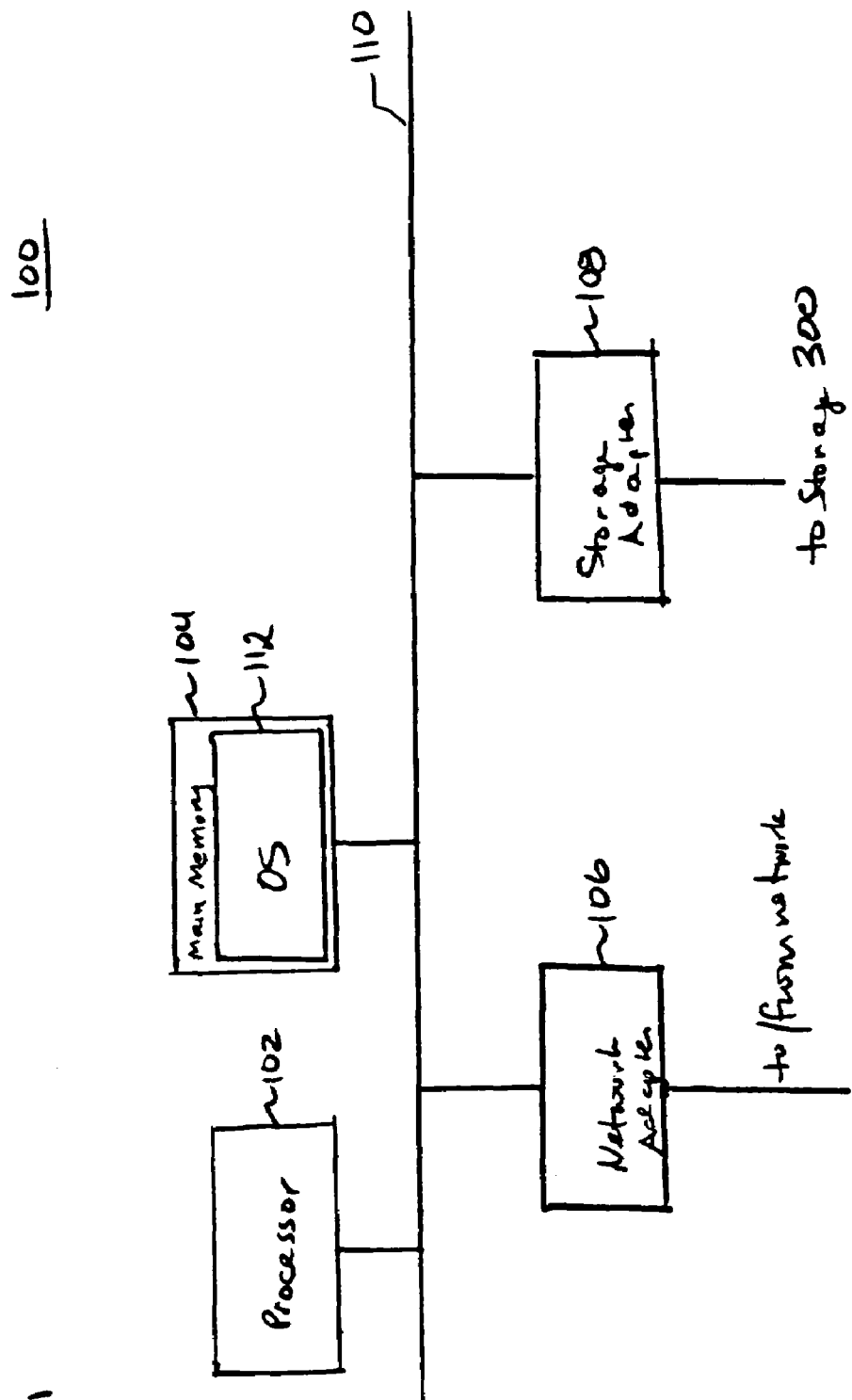
FIG. 1 illustrates a typical computer system on which an embodiment of the present invention may be implemented.

FIG. 1 illustrates a typical computer system 100 on which an embodiment of the present invention may be implemented. According to an embodiment of the invention, the system 100 may be a network storage system, such as a network storage appliance. A network storage appliance is a special-purpose computer that provides file service relating to an organization for information on storage devices, such as disks. A network storage appliance may also provide block level service when implemented as a storage area network (SAN). An example of such a filer is one of the Filer products made by Network Appliance, Inc. of Sunnyvale, Calif. A network storage appliance, such as a file server, or filer, includes an operating system that implements a file system to logically organize the information as a hierarchical structure of directories and files on the disks. However, it is understood that the invention can be implemented in any network attached or other computer system.

The system 100 includes a processor 102, a memory 104, a network adapter 106, and a storage adapter 108. These components are linked through a bus system 110, which represents one or more physical buses with appropriate bus controllers and/or adapters, and/or direct connections. The system 100, as shown in FIG. 1, is typical of a network server or appliance, and it is understood that various different configurations may be used in its place. The processor 102 may be any appropriate microprocessor or central processing unit (CPU), such as those manufactured by Intel or Motorola. The memory 104 may include a main random access memory (RAM), as well as other memories including read only memories (ROM), flash memories, etc. A copy 112 of the operating system is stored in the memory 104 while the system 100 is operating. The operating system 112 may be the OnTap OS by Network Appliance, but may also be Microsoft Windows, the Macintosh OS, a Unix based OS, etc. The OS 112 is stored permanently on a storage device, which may be a magnetic or optical drive such as a hard drive or a compact disc read only memory (CD-ROM) drive. The storage adapter 108 allows the system 100 to communicate with the storage 300, which is described below.

Figure 2:
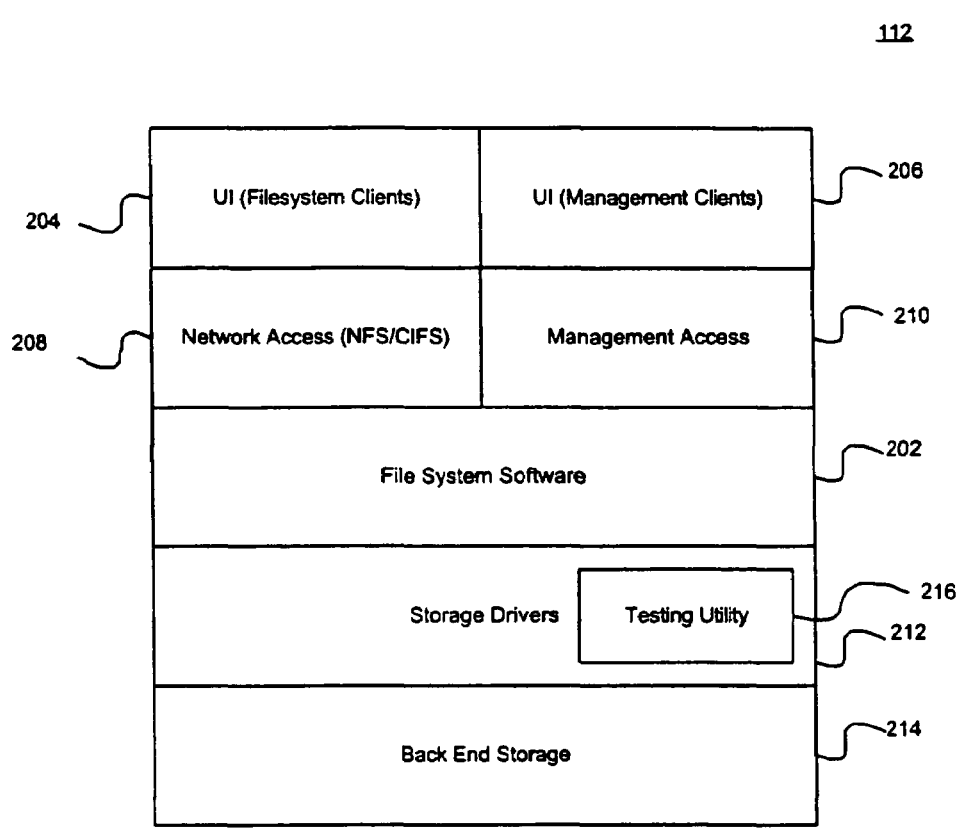
FIG. 2 illustrates the operating system of the computer system, according to certain embodiments of the invention.

FIG. 2 illustrates the operating system 112 of the computer system 100, according to certain embodiments of the invention. As can be seen, the operating system 112 includes a number of layers. The file system software 202 executes read and write operations on the mass storage devices in response to client requests, maintains directories, etc. An example of a file system suitable for this purpose is the Write Anywhere File Layout (WAFL) file system from Network Appliance or the SpinFS file system produced by Spinnaker Networks, Inc. of Pittsburgh, Pa., which was acquired by Network Appliance, Inc.

Above the file system 202, the operating system 112 also includes a user interface for file system clients 204 and a user interface for management clients 206, through which a network administrator or other user can control and/or configure the appliance or system (e.g., remotely from a management station). The user interfaces 204 and 206 may generate a command line interface and/or a graphical user interface for this purpose.

File system clients communicate with the file system software 202 using the file system user interface 204 through the network access layer 208. File system clients may communicate with the network access layer 208 using protocols such as such as the network file system (NFS) protocol or the common Internet file system (CIFS) protocol. According to one embodiment the management clients communicate with the management access module 210 using the HyperText Transfer Protocol (HTTP). It is understood that the management clients may also use other protocols such as NFS or CIFS. The network access layer 208 and the management access layer 210 may communicate with the file system software 202 using the SpinNP protocol by Spinnaker. Other appropriate protocols may also be used.

Below the file system 202, the operating system 112 includes storage drivers 212 and back-end storage 214. The file system 202 may communicate with the storage drivers 212 using, for example, a fibre channel driver or other protocol. The testing utility 216 communicates with the storage drivers 212. The testing utility 216 may implement block allocation testing according to an embodiment of the invention.

Figure 3:
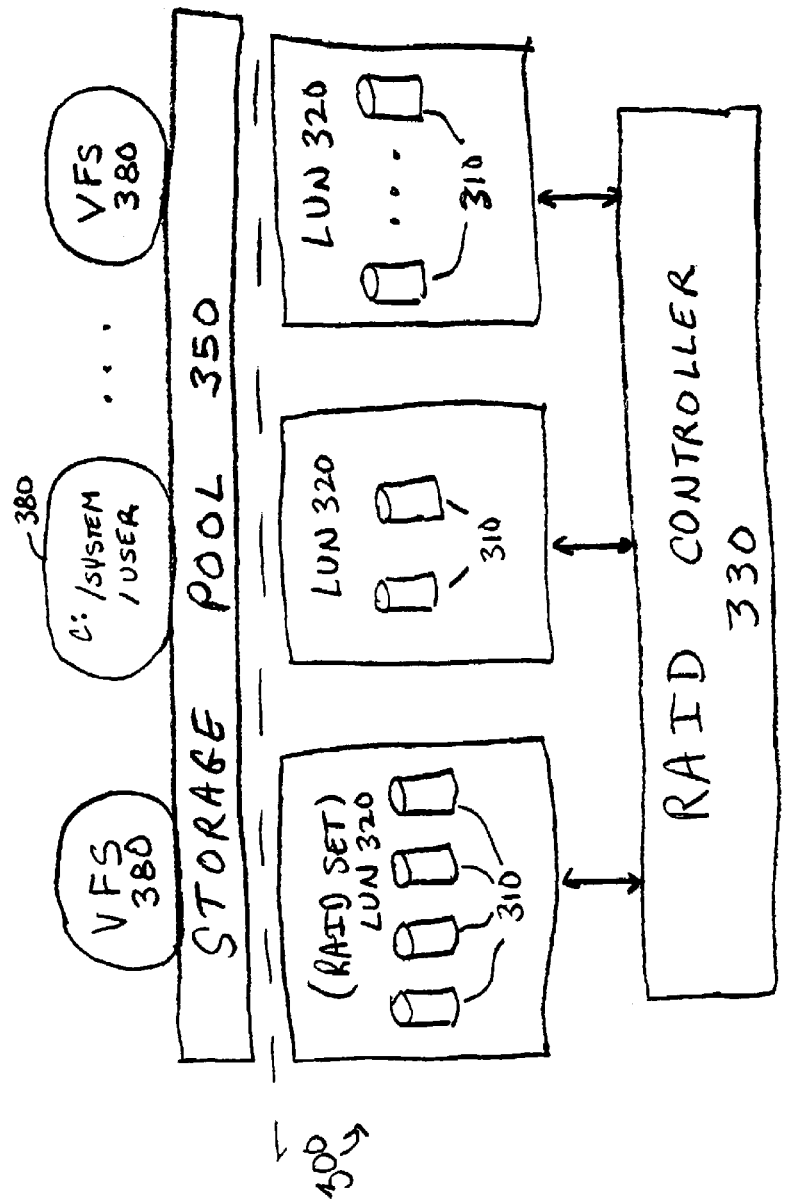
FIG. 3 is a schematic block diagram illustrating the storage subsystem that may be advantageously used with the present invention.

FIG. 3 is a schematic block diagram illustrating the storage subsystem 300 that may be used with the present invention. Storage of information on the storage subsystem 300 is illustratively implemented as one or more storage disks 310 defining an overall logical arrangement of disk space. The disks 310 may further be organized as one or more groups or sets of Redundant Array of Independent (or Inexpensive) Disks (RAID). RAID implementations enhance the reliability/integrity of data storage through the writing of data "stripes" across a given number of physical disks in the RAID group, and the appropriate storing of redundant information with respect to the striped data. The redundant information enables recovery of data lost when a storage device fails. It will be apparent to those skilled in the art that other redundancy techniques, such as mirroring, may used in accordance with the present invention.

Each RAID set is configured by one or more RAID controllers 330. The RAID controller 330 exports a RAID set as a logical unit number (LUN 320) to the system 100, which writes and reads blocks to and from the LUN 320. One or more LUNs are illustratively organized as a storage pool 350. Each storage pool 350 is further organized as a plurality of virtual file systems (VFSs) 380. Each VFS 380 may be organized within the storage pool according to a hierarchical policy that, among other things, allows the VFS to be dynamically moved among nodes of the cluster, thereby enabling the storage pool 350 to grow dynamically (on the fly).

In the illustrative embodiment, a VFS 380 is synonymous with a volume and comprises a root directory, as well as a number of subdirectories and files. A group of VFSs may be composed into a larger namespace. For example, a root directory (c:) may be contained within a root VFS ("/"), which is the VFS that begins a translation process from a pathname associated with an incoming request to actual data (file) in a file system. The root VFS may contain a directory ("system") or a mount point ("user"). A mount point is an object used to "vector off" to another VFS and which contains the name of that vectored VFS. The file system may comprise one or more VFSs that are "stitched together" by mount point objects.

FIG. 4 illustrates a storage pool 400 according to an embodiment of the invention. The storage pool 400 comprises several 4-kilobyte (KB) blocks. Blocks are described by their pool block number (PBN). For example, the first block 402 in the storage pool 400 has PBN 0. The second block 404 has PBN 1, and so on. The first 1023 blocks (PBN 0 through PBN 1022) are in a reserved field 406. The remainder of the storage pool 400 (PBN 1023+) is known as the logical addressing space 408. Blocks within the logical addressing space 408 are assigned a logical block number (LBN), starting with LBN 0 410, continuing with LBN 1 412, LBN 2 414, and so on. LBN 0 410 is a reserved block in which data is not stored. The majority of the file system, including the files themselves, are stored within the logical addressing space 408.

The first block of the pool 400, PBN 0 402, is also known as a "superblock." A copy of the superblock 402 is stored at PBN 1022 416. FIG. 5 illustrates the superblock 402. The superblock 402 includes a header 502 and 15 inodes. As mentioned above, each file has an inode. The inodes in the superblock 402 are for important files used by the file system. For example, the inode 504 stores information about the allocation bitmap. The allocation bitmap includes a listing of which blocks are and which blocks are not used in the storage pool 400. The inode 506 stores information about the VFS file, which contains the information about the volumes stored in the file system. An inode may also contain information about a user-created file, or any other file. The superblock 402 further may contain other inodes for important system files.

FIG. 6 illustrates an inode. The inode 504 for the allocation bitmap is illustrated in FIG. 6. Although FIG. 6 illustrates a specific inode 504, it is understood that other inodes are similar. The inode 504 is a 256-byte data structure representing a single file. The inode 504 comprises a 96-byte header 602 and 160 bytes of direct 604 and indirect 606 block pointers. A block pointer is an 8-byte structure which contains an LBN value and a copy on write bit (CWB), which will be discussed later. Direct block pointers 604 point directly to a block containing user or other data. For example, a direct pointer 604 in the inode 504 may point to the block LBN 1 410, which contains all or a portion of the bitmap allocation file. Indirect block pointers point to another block containing other direct block or indirect block pointers. A block pointer may contain an LBN value of 0. This indicates that the block pointer is unused.

Figure 7:
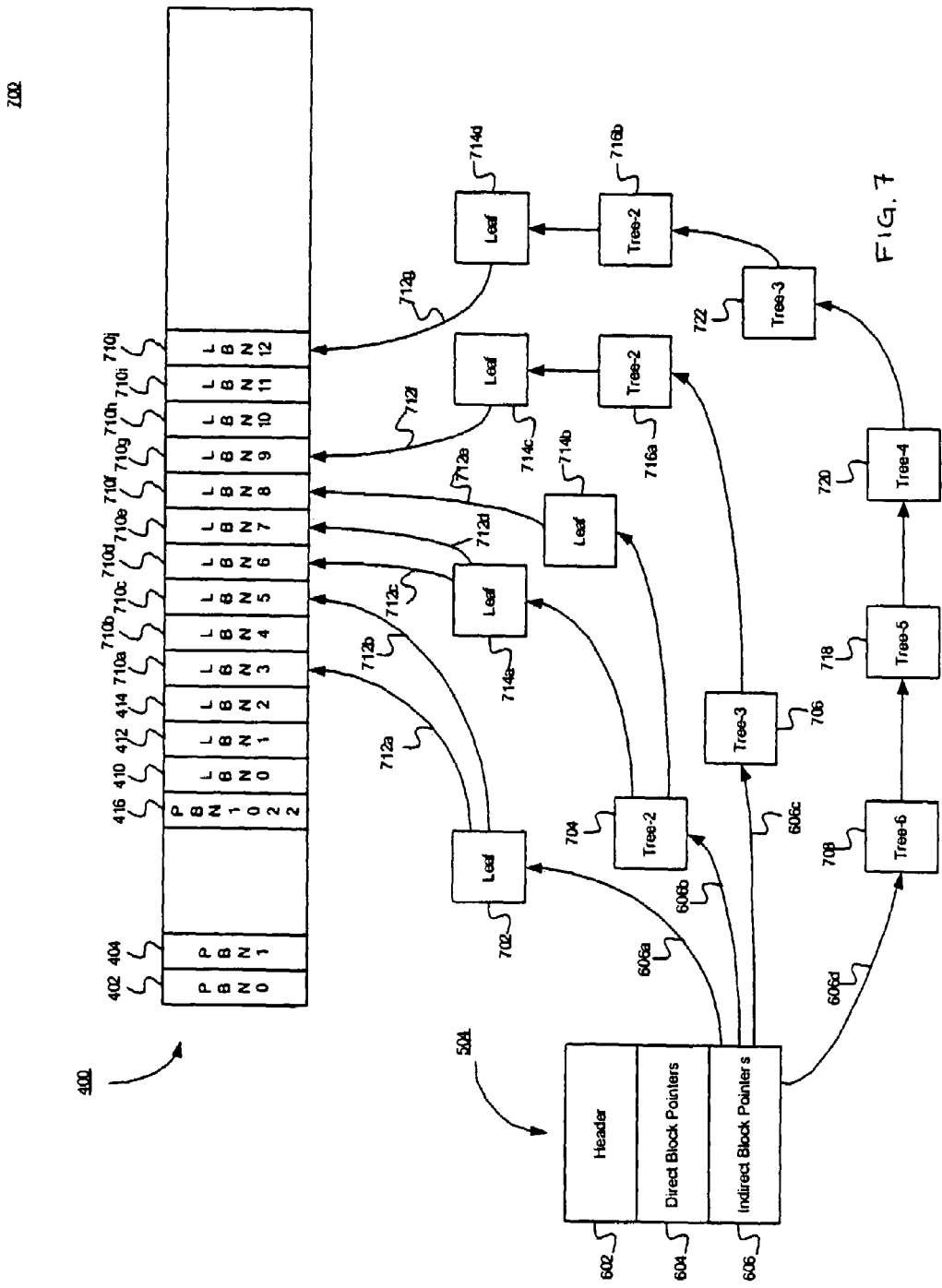
FIG. 7 illustrates several indirect pointers.

An indirect block may have one of several different purposes. A level-1 or "leaf" block contains direct pointers. A level-2 or "tree-2" block contains pointers to leaf blocks. A level-3 or "tree-3" block contains pointers to tree-2 blocks, a level 4 or "tree-4" block pointers to contains tree-3 blocks, a level 5 or "tree-5" block contains pointers to tree-4 blocks, and a level 6 or "tree-6" block contains pointers to tree-5 blocks. An inode includes 16 direct pointers, one leaf pointer, one tree-2 pointer, one tree-3 pointer, and one tree-6 pointer. FIG. 7 illustrates several indirect pointers. The indirect pointers 606 point to a leaf block 702, a tree-2 block 704, a tree-3 block 706, and a tree-6 block 708. The indirect pointers eventually point to a direct pointer 712, which points to a block 710. As can be seen, the leaf blocks 702 and 714 include a direct pointer 712 that points to the blocks 710 in the storage pool 400. The tree-2 blocks 704 and 716 include pointers that point to the leaf blocks 714. The tree-3 blocks 706 and 722 include pointers pointing to the tree-2 blocks 716. The tree-6 block 708 includes a pointer pointing to a tree-5 block 718, which includes a pointer pointing to a tree-4 block 720, which in turn includes a pointer pointing to a tree-3 block 722. This network of indirect pointers can be used to describe the location of a large file spread across many blocks.

When a file read is requested, the file system locates the inode for the file. The inode includes the block pointers pointing to one or more blocks. The file system automatically follows the several indirect and direct pointers found in the inode for a specific file to return a long stream of data that is stored in the file.

The superblock 402 includes the inode 504 that contains information about the bitmap allocation file. FIG. 8 illustrates a bitmap allocation file. The bitmap allocation file 800 contains a number of one-bit fields 802, each corresponding to a block in the storage pool 400. The fields 802 are clear (have a value of 0) if the corresponding block is unused, and set (have a value of 1) if the corresponding block is used. For example, the field 802a is cleared, meaning the corresponding block 710a is unused. The file system maintains the bitmap allocation file 800 during usage, and the block allocation testing will determine whether the bitmap allocation file 800 is accurate.

The superblock 402 also includes an inode for a volumes file, or "vfsfile." FIG. 9 illustrates a vfsfile 900. The vfsfile inode 506 in the superblock 402 includes the information for the vfsfile 900. The vfsfile contains a series of 32-byte records 902, each corresponding to a particular volume. A volume is a basic administration unit in the file system. For example, each user of the system may be assigned their own volume. Each volume has its own root directory, and can individually store its own files. Each volume has its own inodefile inode, which stores information about the inodefile for that volume. The inodefile is a master file which lists the inodes for the files stored in the volume. The inodefile stores one inode for each file created, as well as several special inodes, such as one for the root directory, and one containing information about the volume itself.

The records 902 contain basic information about a volume. As an example, consider the record 902a. The record 902a includes a VFS ID field 904, an upstream ID field 906, a downstream ID field 908, and a pointer to the inodefile LBN field 910 for the volume represented by the record 902a. The VFS ID is a unique identifier for a particular volume. The pointer to the inodefile LBN 910 locates the file which contains the inodes for all of the files in the volume. The concept of upstream and downstream volumes will be explained regarding FIG. 10, but each volume may have an upstream and downstream volume, and their VFS IDs are stored in the fields 906 and 908.

A volume may be "cloned" to preserve the volume's contents at a point in time. For example, a volume may be created on Sunday. On Monday, the files "a.txt" and "b.txt" are written into the volume. On Tuesday, the volume is cloned. The clone is identical to the original volume at the time of cloning. On Wednesday, a user modifies a.txt. If the user wishes to retrieve the original version of a.txt (the one created on Monday), the user can obtain it from the original volume.

Consider that b.txt may be a very large file. Since b.txt has not been changed, it is not efficient to make a copy of b.txt when the clone is created. Therefore, the inode for b.txt in the clone will include block pointers that point to the same blocks that the block pointers in the original's inode point to. Since b.txt has not been modified, there is no data integrity problem. However, when a.txt is modified, the file system will make a new copy of the modified a.txt into new blocks. The block pointers in the clone's inode for a.txt will be modified to point to the new blocks.

The cloned volume and the original volume are considered to be in the same "family" of volumes. The cloned volume is also considered "upstream" of the original volume, while the original is considered "downstream" of the cloned volume.

Figure 10:
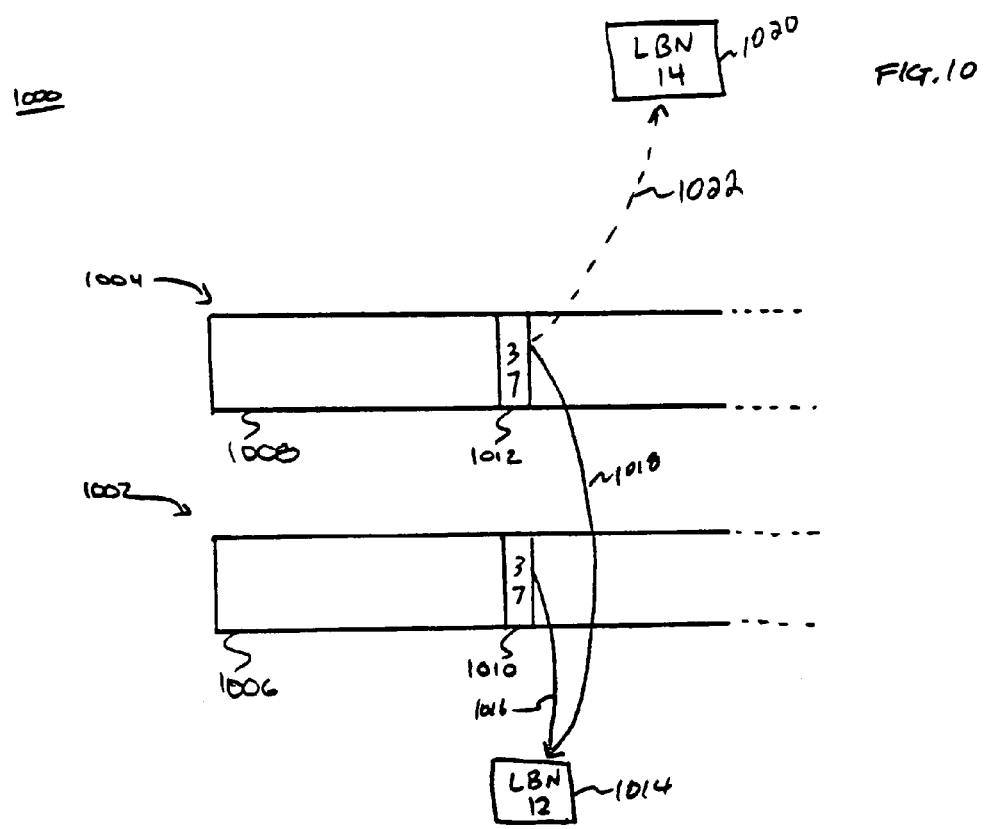
FIG. 10 illustrates a family of volumes.

FIG. 10 illustrates a family of volumes 1000. As shown here, the family 1000 includes two volumes 1002 and 1004. The inodefiles 1006 and 1008 for the two volumes 1002 and 1004 are shown. The two volumes 1002 and 1004 are related because the volume 1004 is a clone of the original volume 1002. According to an embodiment of the invention, the original volume 1002 is cloned at a predetermined time to make the cloned volume 1004. The cloned volume 1004 is currently the most upstream volume. As the most upstream volume, the volume 1004 is the volume that is modified when a user makes changes to the files in the volume. For example, a user may wish to change a file. The changes will be made in the volume 1004, but not in the volume 1002. If the user later decides that they want the original file, the file system can refer to the original copy pointed to by the downstream volume 1002. Each volume essentially keeps a view of the files at a constant point in time. The upstream volume 1004 was made later in time.

Each inode in the inodefiles 1006 and 1008 has a unique ID number. For example, the inode 1010 of the inodefile 1006 and the inode 1012 of the inodefile 1008 both have the ID number 37. If the volume 1004 has not been modified, both inodes 37 1010 and 1012 will point to the same blocks. When the upstream volume 1004 is created, each block pointer in the upstream volume 1004 that does not point to LBN 0 (i.e., every used block pointer) has a copy on write bit (CWB) that is set.

For example, assume that the inode 37 1010 includes a block pointer 1016 that points to LBN 12 1014. When the cloned volume 1004 is created, the inode 37 1012 will also include a block pointer 1018 that points to the LBN 12 1014. Further, the block pointer 1018 will have its CWB set (i.e., the CWB has a value of 1). The CWB indicates that a copy of the block needs to be made when writing. It is acceptable for a single block to have more than one block pointer pointing to it when the extra pointer is from a cloned volume and the file has not been changed since the clone was made. If anything is written to a cloned block, and there is no CWB to indicate that a copy needs to be made, the downstream volume will no longer contain an old copy of the file, and the backup purpose of the cloned volumes is defeated. Therefore, it is very important to ensure that CWBs are properly set.

Now assume that the file corresponding to the inode 37 1012 has been modified. The inode 37 1010 in the downstream volume 1002 will still include a block pointer pointing to a block of the original version in LBN 12 1014. However, the file system will make a copy of the block LBN 12 1014, and store it in a new location, for example LBN 14 1020. The pointer 1018 from the inode 37 1012 will be changed to the pointer 1022, and will now point to the new copy in LBN 14 1020. In this way, the old copy is kept in LBN 12 1014, and a new, modified copy is created in LBN 14 1020. However, in order to preserve the integrity of the downstream volume 1002, the CWB bit for the block pointer 1018 is cleared. If the file system ever, while writing a block, encounters a block pointer that has the CWB set, the file system makes a copy of the block and redirects the pointer to the copy. The CWB is then cleared. This is known as breaking copy on write.

All block pointers, including indirect block pointers, have the CWB and can have it set. Breaking copy on write for an indirect block requires an additional step. After the data in the indirect block is copied to a new location, the CWB is set for all block pointers within the new copy of the indirect block.

Block allocation testing comprises the testing and correction of all block pointers within a file system. Specifically, block allocation testing determines whether the following conditions are true:

1. If a block is in use, then the corresponding bit in the bitmap allocation file is set.
2. If a block is not in use, then the corresponding bit in the bitmap allocation file is not set.
3. Two or more block pointers can reference the same block only if the following conditions are met:
   a. Each block pointer is located in a different volume
   b. The block pointers are in volumes that are all part of the same family
   c. The block pointers all belong to inodes having the same inode number
   d. The pointers all appear at the same offset within the file
   e. The downstream-most block pointer's CWB is clear
   f. All upstream block pointers' CWB is set The several conditions required under 3. determine that if a block is referenced to by more than one pointer, the pointers all originate from volumes that are clones of each other. It follows that the pointers should all be located at the same position in the volume, and these conditions confirm that.

As mentioned above, the file system is inaccessible while the testing is occurring. As a result, it is advantageous to reduce the amount of time required for testing and repairing the file system. FIGS. 11-17 describe a process for performing block allocation testing that requires substantially reduced memory use compared to the prior art method mentioned above and which can more easily be parallelized than previous implementations.

Figure 11:
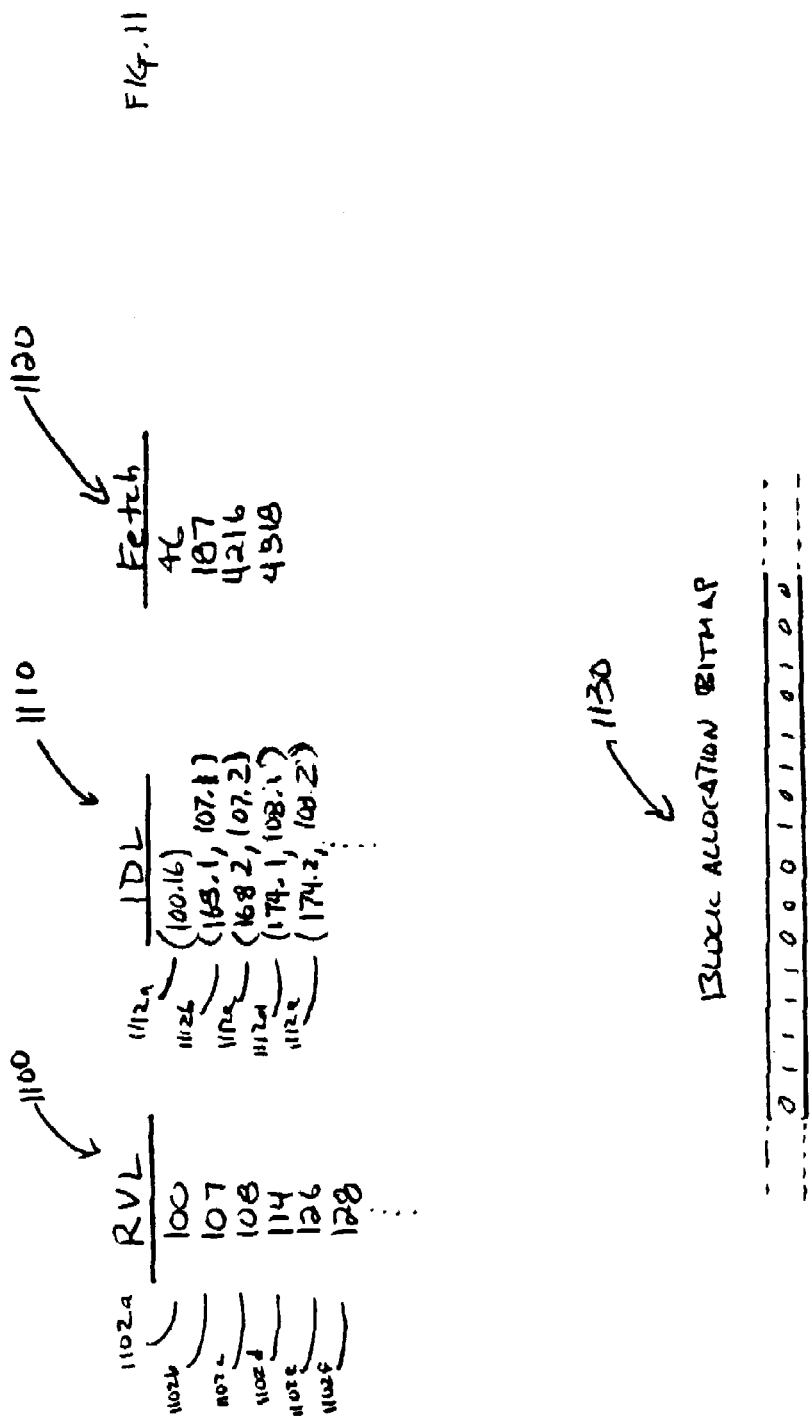
FIG. 11 illustrates several data structures used by the file system during block allocation testing.

FIG. 11 illustrates several data structures used by the file system during block allocation testing. The ready volume list 1100 includes a list of volumes that are ready to be tested by the testing process. According to one embodiment, the volumes may be referred to by an integer. For example, the first volume on the list 1102a is referred to by the integer 100.

The inode data list (IDL) 1110 includes several entries 1112. Each entry 1112 in the inode data list 1110 includes a list of one or two inodes. For example, the first entry 1112a lists the inode 100.16. The number 100 refers to the volume in which the inode is stored. The number 16 refers to the $16^{th}$ inode in the volume 100. The second entry 1112b lists two inodes, 168.1 and 107.1. When two inodes are listed, the first inode in the list is in a volume directly upstream of the second inode, and when one inode is listed, the listed inode belongs to the downstream-most volume of a family. For example, the volume 168 is directly upstream of the volume 107, and the volume 100 is the downstream-most volume in a family. The inodes are added to the IDL 1110 during the process that will be explained regarding FIG. 12.

A fetch list 1120 includes a list of LBNs that were referred to by indirect pointers. When processing the inodes, the allocation testing may happen upon a block pointer that points to an indirect block. If the in direct block is not in an in-memory cache, the indirect block is placed on the fetch list 1120. Once the number of items on the fetch list 1120 exceeds a threshold, a "fetcher" will process the fetch list and retrieve the blocks that are referred to by the pointers on the fetch list 1120.

A block allocation bitmap 1130 is maintained by the testing process. The block allocation bitmap 1130 is kept in memory, and is compared to the block allocation bitmap 800 referred to by the superblock 402. The block allocation bitmap 1130 is also used to determine whether a block is improperly crosslinked, as will be explained below.

Figure 12:
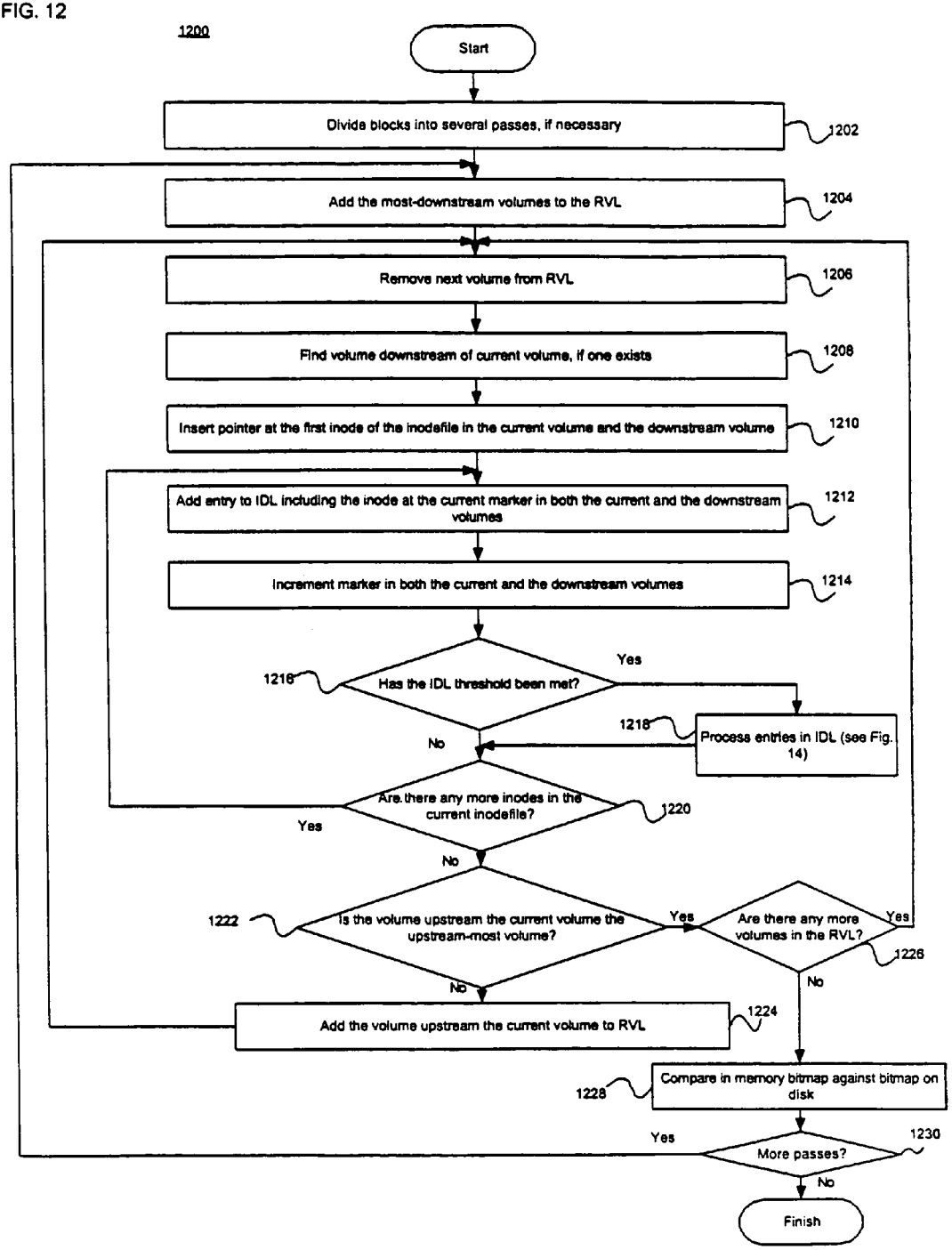
FIG. 12 is a flowchart describing a process of populating the IDL list.

FIG. 12 is a flowchart describing a process 1200 of populating the IDL list 1110. The process 1200 explains the basic process for block allocation testing according to an embodiment of the invention. In block 1202, the storage pool 400 is divided into several passes, if necessary. Depending on the number of blocks and the amount of memory a system has, the process 1200 may have to divide the storage pool 400 into two or more passes. One bit for each block in the range of blocks to be tested is required, as well as sufficient extra memory to perform the testing operations and store the data structures described regarding FIG. 11. The storage pool 400 can be divided as is appropriate.

In block 1204, the most-downstream volumes in the storage pool 400 are added to the ready volumes list (RVL) 1100. A volume cannot be tested until the volume downstream of it has been thoroughly tested, since the testing process often refers to downstream block pointers. The volumes in the RVL 1100 are those that are ready to be tested, and more upstream volumes are added once the volume immediately downstream has been tested.

In block 1206, the next volume in the RVL 1100 is removed, and it becomes the current volume. In block 1208, if there is a volume downstream the current volume, it is found. In block 1210, a pointer is inserted at the first inode of both the current volume's and the downstream volume's inodefile.

Figure 13:
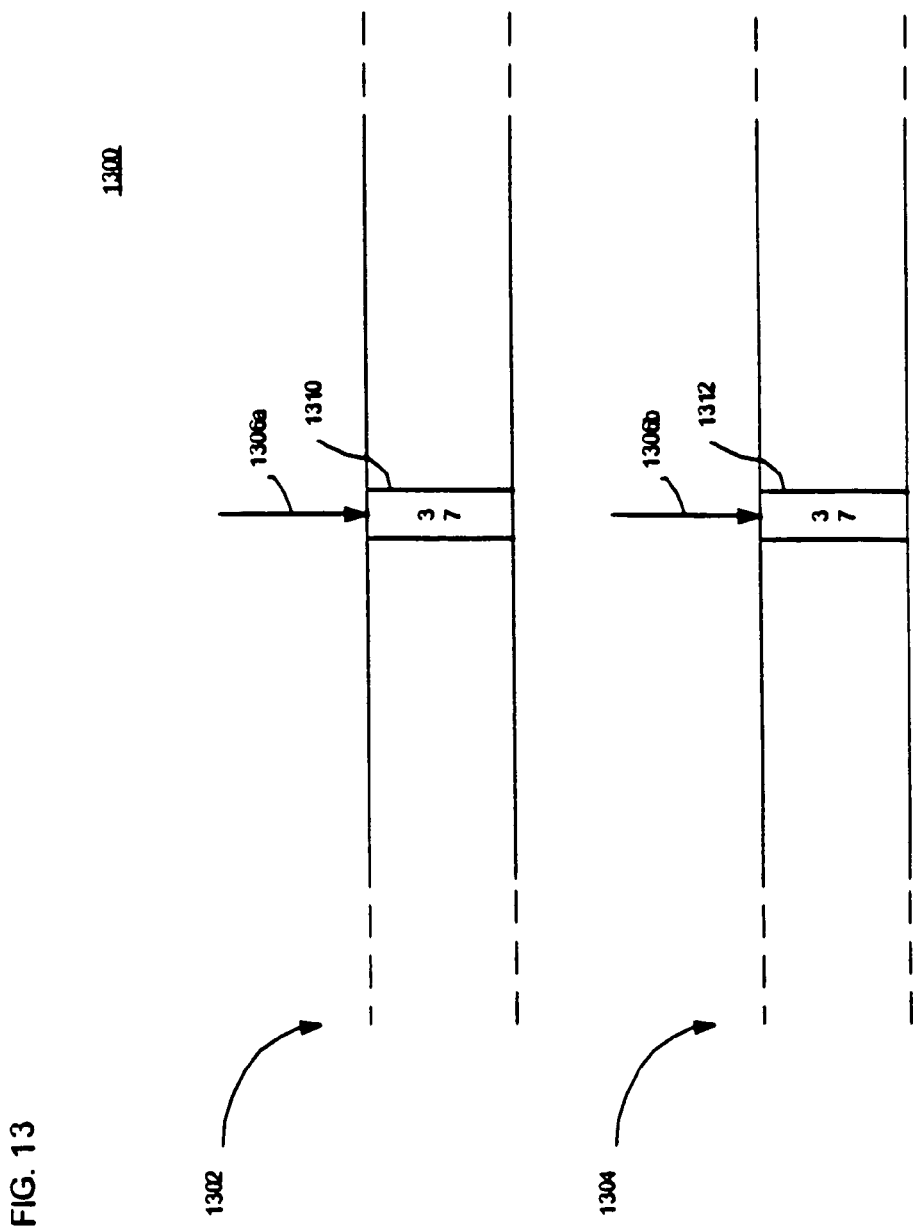
FIG. 13 illustrates a marker in an inodefile.

FIG. 13 illustrates a marker in an inodefile. The two inodefiles 1302 and 1304 belong to two volumes of the same family. The inodefile 1302 is upstream of the inodefile 1304, and thus references a point later in time. The pointers 1306 are always pointing to the same inode in the two inodefiles 1302 and 1304. For example, here the pointers 1306 are both pointing to inode 37. The CWB for the block pointers in the top inode 1310 should be set if it has not been written to since the volume corresponding to the inodefile 1302 was created.

Returning to the process 1200, in block 1212, an entry is added to the IDL 1110. The entry includes the inode ID for the current volume (the upstream volume) and the corresponding inode ID of the volume immediately downstream. The process can easily reference the markers 1306 to determine which inode ID to add to the IDL 1110. Whichever inodes the markers 1306 are pointing at are added to the entry. Thus, then entry contains two inodes at the same position in the two inode files. For example, the entry may contain the ID of the two inodes at position 37. If the inode in the current volume has not been written to, the block pointers in that inode should point to the same blocks as the pointers in the inode in the downstream volume. The testing process confirms that this is correct. If there is only one volume being added to the IDL 1110 (e.g., the volume is the most downstream), the process 1200 only adds one inode ID per entry). In block 1214, the marker is incremented to the next inode. Using the above example, the marker would move to inode 38 in both volumes.

In block 1216, it is determined whether the IDL 1110 threshold has been met. A predetermined threshold designates the number of entries that should be in the IDL 1110 before the allocation testing can be performed efficiently. The threshold will differ depending on system configuration. According to one embodiment, The IDL 1110 can only accommodate a limited number of entries to reduce the amount of memory it occupies. If the threshold has been reached, the process 1200 continues to block 1218, where the entries on the IDL 1110 are processed (See FIG. 14). If the threshold has not been reached, the process 1200 continues to block 1220, where it is determined whether there are any more inodes in the inodefile of the current volume. If there are, the process 1200 returns to block 1212. If there are no more inodes, the process 1200 continues to block 1222.

In block 1222, it is determined whether the current volume is the upstream-most volume in its family. If it is not, the volume upstream of the current volume is added to the end of the RVL 1100 in block 1224, and the process returns to block 1206. If the volume is the upstream-most in its family, the process 1200 continues to block 1226, where it is determined whether there are any more volumes in the RVL 1100. If there are more volumes, the process 1200 returns to block 1206.

If there are no more volumes in the RVL 1100, in block 1228, the process 1200 determines whether the in-memory bitmap 1130 and the on-disk bitmap 800 are the same. The two can be compared bit by bit to ensure that the on-disk bitmap 800 is correct, and the on-disk bitmap 800 can be corrected if there are discrepancies with the in-memory bitmap 1130. As is explained below in FIG. 16, the testing process sets the bit for every used block in the in-memory bitmap 1130. The bitmap 1130 is then compared with the on-disk bitmap 800 as part of the testing process to ensure that the on-disk bitmap 800 is correct. After the bitmaps 800 and 1130 are tested and corrected if necessary, the process 1200 flushes the in-memory bitmap 1130 and continues to block 1230.

If the storage pool 400 was divided into more than one pass in block 1202, in block 1230, the process returns to block 1204, where the next pass is analyzed. The in-memory data structures described in FIG. 11 are reset when the new pass begins. If there are no more passes to be tested, the process 1200 of testing block allocation is finished.

Figure 14:
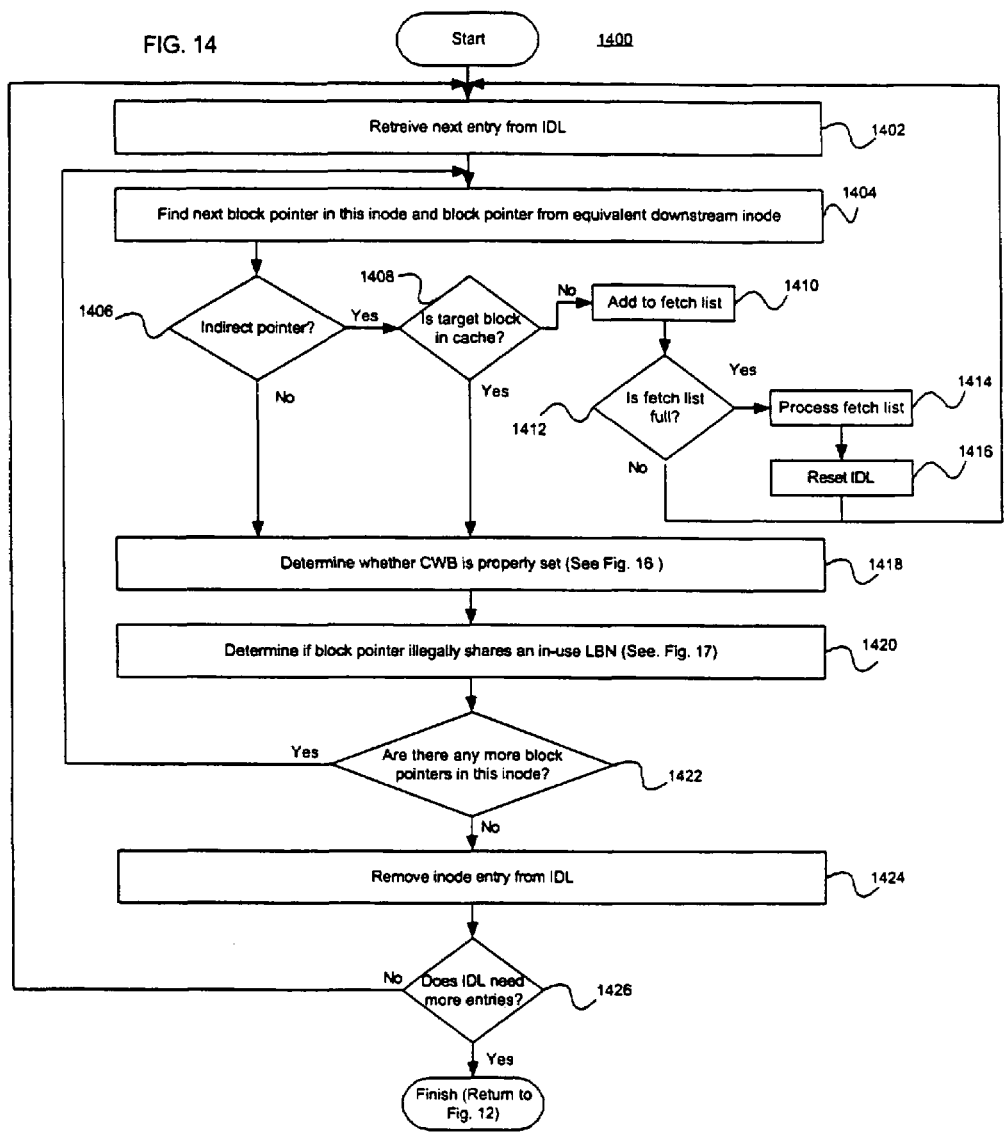
FIG. 14 is a flowchart illustrating a process for testing block allocation according to an embodiment of the invention.

FIG. 14 is a flowchart illustrating a process for testing block allocation according to an embodiment of the invention. The process 1400 tests to make sure that a CWB for each block pointer is properly set, and that there are no impermissible crosslinks. The process 1400 occurs at block 1218 in the process 1200.

Figure 15:
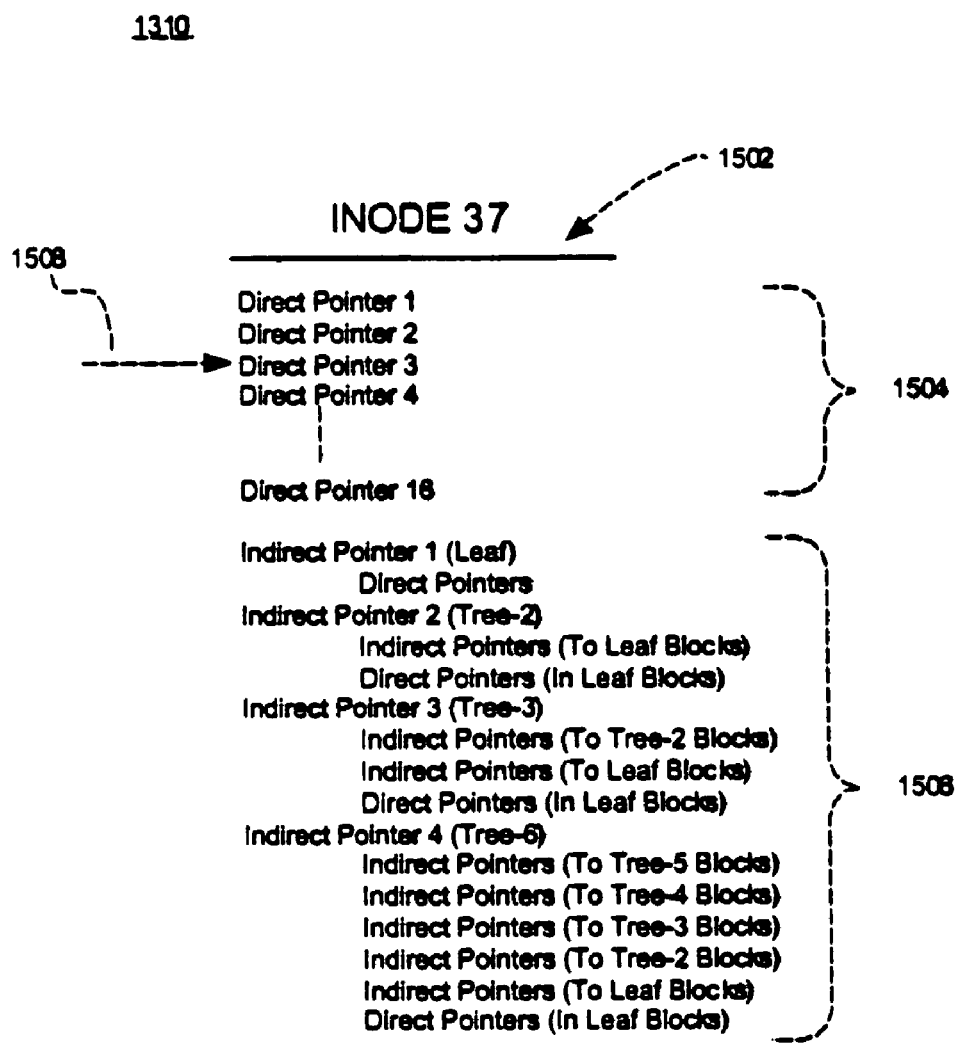
FIG. 15 illustrates a list of pointers in an inode.

In block 1402, the next entry from the IDL 1110 is retrieved. In block 1404, the next pointer in the inode(s) found in the item are retrieved. Each block pointer in an inode is tested. FIG. 15 illustrates a list 1502 of pointers in an inode 1310. The inode 1310 is used as an example, and it is understood that other inodes may have different structures. As can be seen, the inode 1310 includes 16 direct pointers 1504, and four indirect pointers 1506. The marker 1508 indicates the pointer to be tested. The process 1400 first tests all direct pointers 1504 in the inode 1310. Next, the indirect pointers 1508 are tested. First, the leaf pointer is tested, and then the direct pointers in the leaf block. After that, the pointer pointing to the tree-2 block is tested, and then the pointers in the tree-2 block are tested. And so on, until all of the pointers stored in the inode 1310, or pointed to by the inode 1310, are tested. The marker 1508 is incremented once a pointer has been tested. If there is an upstream 1310 and a downstream inode 1312, the two retrieved pointers correspond to each other, and are in the same position in the inodes. The downstream inode 1312 also has a marker in the same position as the marker 1508. The upstream pointer 1310 is the pointer being tested here, the downstream pointer 1312 is used to ensure that the characteristics of the upstream pointer are properly set, as will be explained.

If the upstream pointer 1310 is an indirect pointer, as determined in block 1406, the process 1400 continues to block 1408, where it is determined whether the block to which the indirect pointer refers is stored in an in memory cache. If the block is not stored in the cache, the block to which it points is added to the fetch list 1120 in block 1410. After the block is added to the fetch list 1120, it is determined whether the fetch list 1120 is full in block 1412. If the fetch list 1120 is not full, the process 1400 returns to block 1402, since progress cannot be made on the current inode until the blocks are retrieved.

If the fetch list 1120 is full, in block 1414, the fetch list 1120 is processed. The fetch list 1120 is full when the number of items on the fetch list 1120 exceeds a predetermined threshold. The fetch list 1120 is needed so that the process 1400 does not have to perform time intensive disk reads during testing. Disk reads have high latency. That is, a long period of time is required to commence the read, and the amount of startup time is similar regardless of the amount of data being read. Therefore, it is advantageous to read several blocks at once from the disk rather than one. The threshold may be a number of blocks that makes the expenditure of time required for the reads worthwhile. Processing the fetch list 1120 simply comprises reading the requested blocks into a cache memory so that they can be processed later. The fetch list 1120 can also be processed if there are no more entries in the IDL 1110, and there are no more entries in the RVL 1100.

In block 1416, the IDL 1110 is reset, and the process 1400 returns to block 1402, where the next entry from the IDL 1110 is removed. When resetting the IDL 1110, the next entry removed is at the top of the IDL 1110. The inodes that have been fully tested are removed from the IDL 1110 in block 1424, so resetting the IDL 1110 allows the process 1400 to test those inodes that were only partially tested. Testing of the partially tested inodes can now proceed since the fetch list 1120 has been processed.

In block 1418 it is determined whether the CWB for the block is properly set. This process is explained in the description regarding FIG. 16. In block 1420, it is determined whether the block pointer illegally shares an in-use LBN. This process is explained in the description regarding FIG. 17.

In block 1422, it is determined whether there are any more block pointers in the inode to be processed. If there are, the marker 1508 is incremented, and the process 1400 returns to block 1404. If not, all of the pointers in the current inode have been tested and corrected if necessary, and the current entry can be removed from the IDL 1110 in block 1424.

In block 1426, the process 1400 determines whether the IDL 1110 needs any more entries to be efficient. If it does, the process 1400 is finished, and processing is returned to the block 1220, described above. If the IDL 1110 does not need more entries, the process 1400 removes the next inode from the IDL in block 1402.

Figure 16:
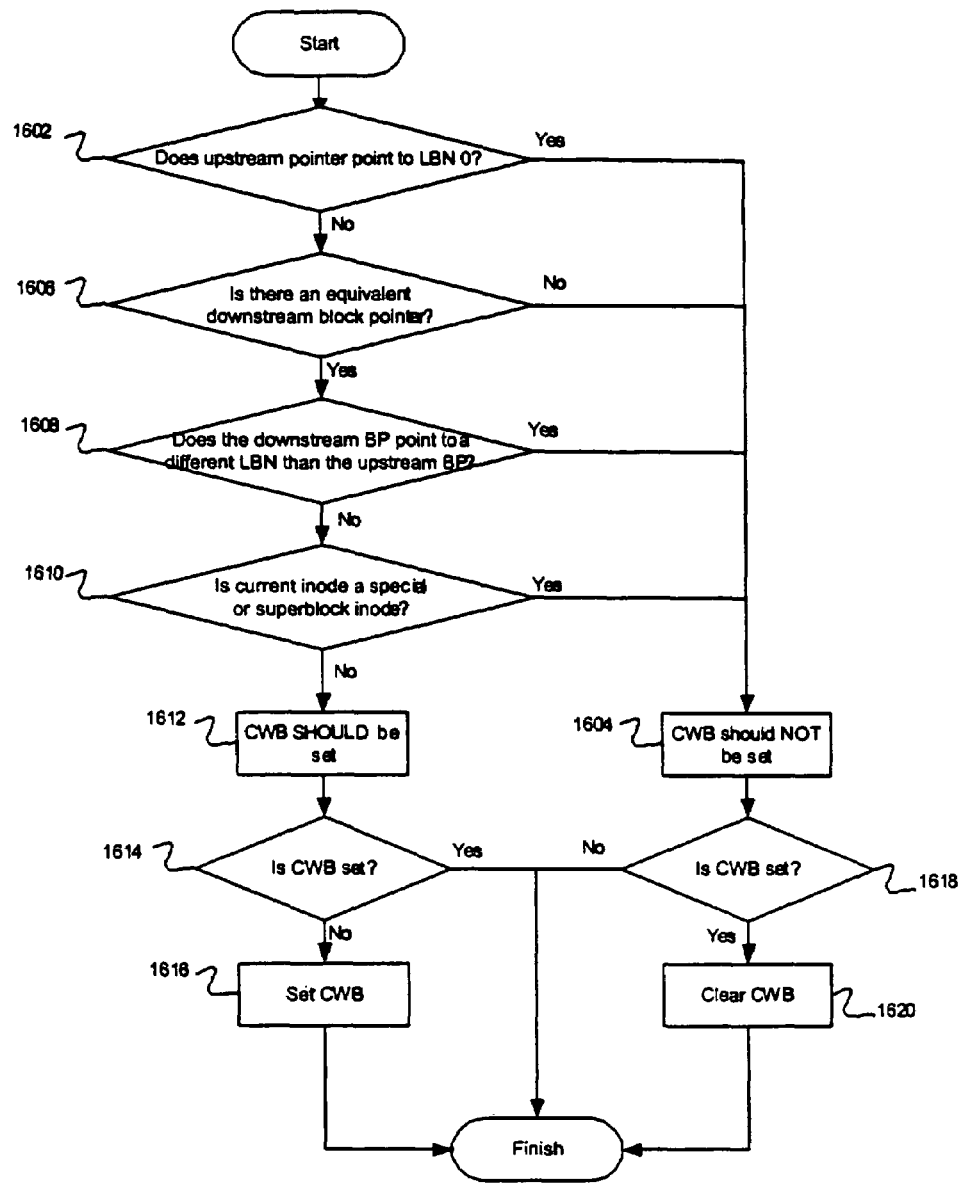
FIG. 16 is a flowchart describing a process for testing whether a CWB is properly set.

FIG. 16 is a flowchart describing a process for testing whether a CWB is properly set. The process 1600 occurs at block 1418 in the process 1400 described above. The process is performed on an individual block pointer and its downstream counterpart. The block pointer being tested is referred to as the "upstream" block pointer, while the corresponding downstream block is referred to as the "downstream" block pointer.

In block 1602, it is determined whether the upstream pointer points to LBN 0. As mentioned above, according to an embodiment of the invention, LBN 0 is reserved, and all block pointers that are unused point to LBN 0. Since a block pointer pointing to LBN 0 would not be cloned, the block pointer should not have the CWB set. Therefore, if the block pointer points to LBN 0, the process 1600 continues to block 1604.

If the block pointer does not point to LBN 0, the process 1600 continues to block 1606, where it is determined whether the upstream block pointer has an equivalent downstream block pointer. If it does, the process 1600 continues to block 1608. If it does not, the CWB should not be set, and the process 1600 continues to block 1604. The CWB should not be set if there is no equivalent downstream block pointer, since the CWB should only be set to indicate that the block to which the current block pointer points needs to be copied. If there is no downstream block pointer, the block does not need to be copied, since the block pointer has not been cloned.

In block 1608, it is determined whether the downstream block pointer points to a different LBN than the upstream block pointer. If it does, the CWB should not be set, since this condition would indicate that the file to which the upstream block pointer points to has been modified. The process 1600 then continues to block 1604. If the upstream and downstream block pointers both point to the same LBN, the process 1600 continues to block 1610.

In block 1610, it is determined whether the current inode is a special or superblock inode. These inodes are not cloned, so the CWB should not be set. If the inode is a special or superblock inode, the process continues to block 1604. If it is not, then the CWB should be set, and the process continues to block 1612.

The process 1600 also describes repairing the CWB if it is improperly set. In block 1614 it has been determined that the CWB should be set, and it is determined whether the CWB is set. If it is, then the process 1600 finished. If the CWB for the upstream pointer is not set, in block 1616 the CWB is set, and the process 1600 finishes. If it has been determined by the process 1600 that the CWB should not be set, in block 1618, it is determined whether the CWB is set. If it is not, the process 1600 finishes. If it is set, the process continues to block 1620, where the CWB is cleared. After that, the process 1600 finishes.

Figure 17:
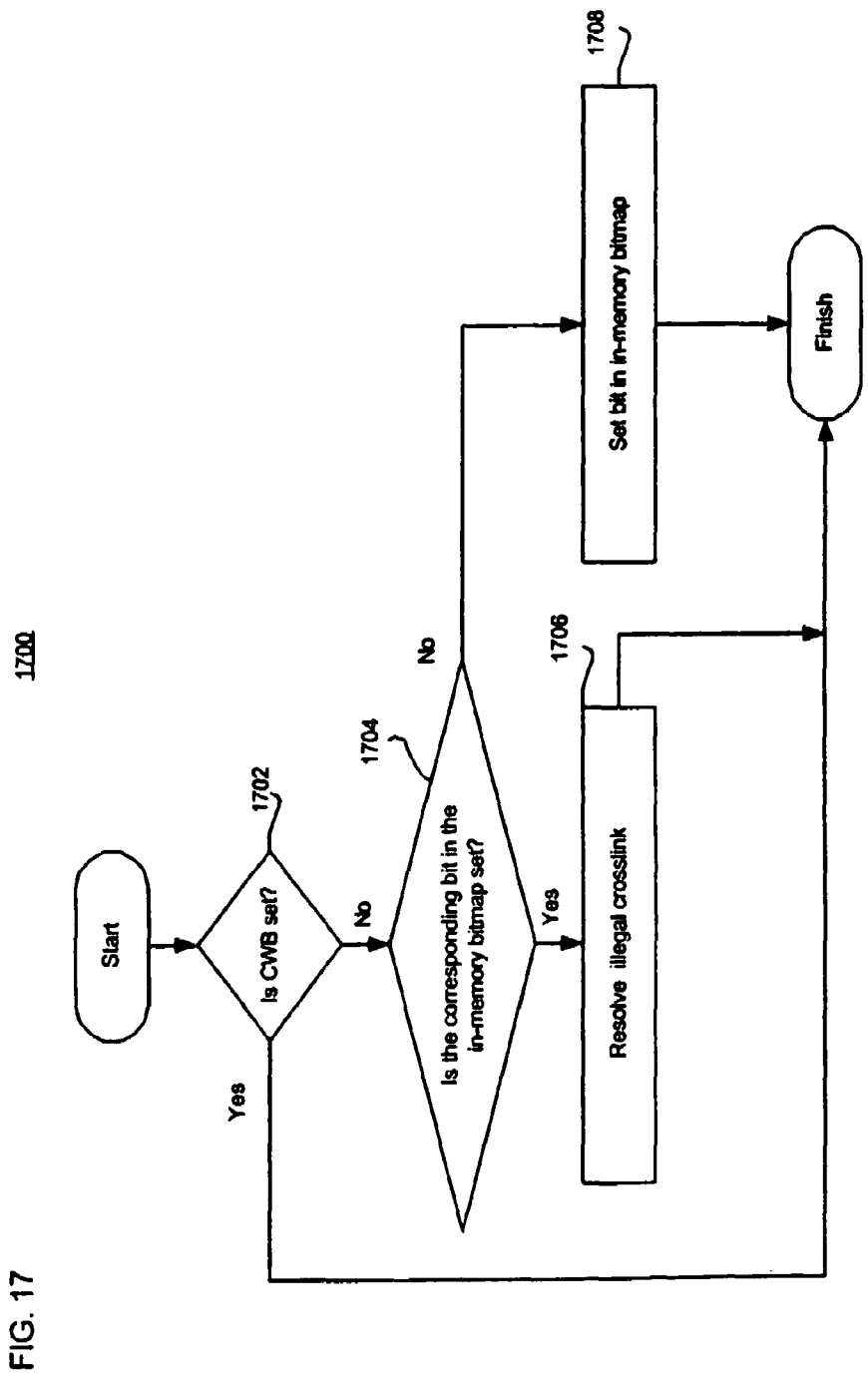
FIG. 17 is a flowchart describing a process for determining whether a block pointer illegally shares an in-use LBN.

FIG. 17 is a flowchart describing a process for determining whether a block pointer illegally shares an in-use LBN. A block pointer may only point to an in-use LBN if that block pointer belongs to the same inode as another volume in the same family and the CWB bit is set. All other occurrences of more than one block pointer pointing to the same block are known as "crosslinking" and must be repaired to preserve data integrity.

The process 1700 describes determining whether a block is illegally crosslinked. In block 1702, it is determined whether the CWB for the pointer is set. Here, we are considering the upstream pointer. If the CWB is set, the process 1700 finishes, since the pointer may legally point to a block having more than one pointer pointing to it. If it is not set, the process continues to block 1704.

In block 1704, it is determined whether the corresponding bit in the in-memory bitmap is set. If the bit is set, it indicates that there is already another pointer pointing to this block. As a result, there is an illegal crosslink, which is resolved using known processes in block 1706. If the bit is not set, the process 1700 continues to block 1708, where the bit in the in-memory bitmap 1130 is set. The bit is set whenever a block is in use, so the bit in the bitmap 1130 corresponding to the block to which the block pointer is pointing is set. The process 1700 then finishes.

One advantage of the processes described herein is that they may easily be parallelized. Several inodes may be processed at once. The testing process can select several inodes from the IDL 1110 to be simultaneously processed. This way, the memory and storage are being fully utilized, so that the storage may become available to users in less time.

The techniques introduced above have been described in the context of a NAS environment. However, these techniques can also be applied in various other contexts. For example, the techniques introduced above can be applied in a storage area network (SAN) environment. A SAN is a highly efficient network of interconnected, shared storage devices. One difference between NAS and SAN is that in a SAN, the storage server (which may be an appliance) provides a remote host with block-level access to stored data, whereas in a NAS configuration, the storage server provides clients with file-level access to stored data. Thus, the techniques introduced above are not limited to use in a file server or in a NAS environment.

The foregoing description has been directed to particular embodiments of this invention. It will be apparent, however, that other variations and modifications may be made to the described embodiments, with the attainment of some or all of their advantages. Specifically, it should be noted that the principles of the present invention may be implemented in/with non-distributed file systems. Additionally, the procedures or processes may be implemented in hardware, software, embodied as a computer-readable medium having program instructions, firmware, or a combination thereof. Therefore, it is the object of the appended claims to cover all such variations and modifications as come within the true spirit and scope of the invention.

What is claimed is:

1. A method for performing block allocation testing on a storage server, the method comprising:
    retrieving, by the server, an entry from a data structure, the entry including a first inode of a first volume and a second inode of a second volume, wherein the first and second volumes are from a same family of volumes and the second volume is downstream from the first volume;
    identifying a first block pointer from the first inode;
    identifying a second block pointer from the second inode, wherein the second block pointer is located at the same offset within the second inode as the first block pointer in the first inode;
    determining whether a value of a copy on write indicator of the first block pointer satisfies a predetermined criterion for evaluation of correctness, based on a value of the first block pointer and a value of the second block pointer; and
    modifying the value of the copy on write indicator in response to a determination that the value does not satisfy the predetermined criterion, to maintain data integrity of the storage server.

2. The method of claim 1, wherein the data structure comprises an inode data list (IDL).

3. The method of claim 2, wherein the IDL comprises a plurality of entries, each entry having one or two inodes, and wherein if the corresponding entry has two inodes, one of the two inodes belongs to one file system and the other inode of the two inodes belongs to another file system downstream from said one file system.

4. The method of claim 1, wherein determining whether a value of a copy on write indicator of the first block pointer satisfies a predetermined criterion comprises:
    determining whether the first block pointer has a first logical block number (LBN) of a predetermined value;
    determining whether there is no second block pointer corresponding to the first block pointer;
    determining whether the first LBN has a value different from a second LBN of the second block pointer; and
    determining whether the first inode is a special inode.

5. The method of claim 1, further comprising:
    setting a bit at a position in an in memory bitmap corresponding to a block to which the first block pointer points; and
    determining whether a system bitmap has a corresponding bit set in the position.

6. The method of claim 1, further comprising:
    adding the first block pointer to a fetch list if the block pointer is an indirect pointer and the block pointer is not present in an in-memory cache.

7. The method of claim 1, wherein the copy on write indicator comprises a copy on write bit.

8. A method as recited in claim 1, wherein determining whether the value of a copy on write indicator of the first block pointer satisfies the predetermined criterion for evaluation of correctness comprises:
    determining whether the first block pointer and the second block pointer point to the same logical block;
    wherein if the first block pointer and the second block pointer point to the same logical block, the value of the copy on write indicator satisfies the predetermined criterion only if said value indicates that a copy of the block needs to be made in conjunction with a write operation.

9. A method as recited in claim 8, wherein if the first block pointer and the second block pointer point to the same logical block, then the value of a copy on write indicator satisfies the predetermined criterion only if the value indicates that a copy of the block needs to be made in conjunction with a write operation.

10. A method for performing a block allocation test on a storage server comprising:
    adding, by the server, a most-downstream set of volumes of the storage server to a ready volume list (RVL), wherein the set of volumes are from a same family of volumes;
    adding a set of entries to an inode data list (IDL), wherein each of the set of entries includes one or two inodes, one of the one or two inodes belonging to a volume of the set of volumes, the other inode of the one or two inodes, if said the other inode exists, belonging to a downstream volume of the volume;
    retrieving an entry from the IDL;
    if the entry includes two inodes, identifying a first block pointer from a first inode of the two inodes, and identifying a second block pointer from a second inode of the two inodes;
    determining whether a value of a copy on write bit of the first block pointer satisfies a predetermined criterion for evaluation of correctness; and
    modifying the value of the copy on write bit of the first block pointer in response to a determination that the value does not satisfy the predetermined criterion, to maintain integrity of data of the storage server.

11. The method of claim 10, wherein determining whether the value of the copy on write bit is correct comprises:
    determining whether the first block pointer points to a logical block number (LBN) having a value of zero;

determining whether the first and the second block pointer both point to a same LBN; and determining whether the first block pointer is inside a special inode.

12. The method of claim 10 further comprising:

determining whether the copy on write bit is set and whether the first block pointer and the second block pointer point to a same block.

13. The method of claim 10 further comprising:

determining whether the copy on write bit is set and whether an in-memory bitmap includes a first bit corresponding to the first block pointer.

14. The method of claim 10, further comprising:

setting a first bit corresponding to a first block to which the first block pointer points in an in-memory bitmap.

15. A computer system comprising:

a processor;

a storage device including a storage pool comprising a set of blocks;

a memory coupled to the storage device, the memory storing an inode data list (IDL) and sequences of instructions which, when executed by the processor, causes the processor to perform a process, the process comprising:

retrieving an entry from the IDL, the entry listing a first inode of a first volume and a second inode of a second volume, wherein the first and second volumes are from a same family of volumes and the second volume is downstream from the first volume;

identifying a first block pointer from the first inode;

identifying a second block pointer corresponding to the first block pointer from the second inode;

determining whether a value of a copy on write indicator of the first block pointer satisfies a predetermined criterion for evaluation of correctness; and modifying the value of the copy on write indicator of the first block pointer in response to a determination that the value does not satisfy the predetermined criterion, to maintain data integrity of the computer system.

16. The computer system of claim 15, wherein determining whether a value of a copy on write indicator is correct comprises:

determining whether the first block pointer has a first logical block number (LBN) of a predetermined value;

determining whether there is no second block pointer corresponding to the first block pointer;

determining whether the first LBN has a value different from a second LBN of the second block pointer; and determining whether the first inode is a special or superblock inode.

17. The computer system of claim 15, wherein the process further comprises:

setting a bit at a position in an in memory bitmap corresponding to a block to which the first block pointer points; and determining whether a system bitmap has a corresponding bit set in the position.

18. The computer system of claim 15, wherein the process further comprises:

adding the first block pointer to a fetch list if the first block pointer is an indirect pointer and the first block pointer is not present in an in-memory cache; and testing a next entry on the list.

19. A computer-readable storage medium having stored thereon executable program code which, when executed, causes a server to perform a process for performing block allocation testing, the process comprising:

retrieving an entry from a list, the entry listing a first data structure of a first volume and a second data structure of a second volume, wherein the first and second volumes are from a same family of volumes and the second volume is downstream from the first volume;

identifying a first block pointer from the first data structure;

identifying a second block pointer from the second data structure;

determining whether a value of a copy on write bit for the first block pointer satisfies a predetermined criterion for evaluation of correctness; and modifying the value of the copy on write bit in response to a determination that the value does not satisfy the predetermined criterion, to maintain data integrity.

20. The computer-readable storage medium of claim 19, wherein the first data structure comprises a first inode, and wherein the second data structure comprises a second inode.

21. The computer-readable storage medium of claim 20, wherein the list comprises an inode data list (IDL).

22. The computer-readable storage medium of claim 21, wherein the IDL comprises a plurality of entries, each entry listing one or two inodes, and wherein if the corresponding entry has two inodes, one of the two inodes belongs to one file system and the other inode of the two inodes belongs to another file system downstream from said one file system.

23. The computer-readable storage medium of claim 19, wherein determining whether a value of a copy on write bit is correct comprises:

determining whether the first block pointer has a first logical block number (LBN) of a predetermined value;

determining whether there is no second block pointer corresponding to the first block pointer;

determining whether the first LBN has a value different from a second LBN of the second block pointer; and determining whether the first data structure is a special data structure.

24. The computer-readable storage medium of claim 19, wherein the process further comprises:

setting a bit at a position in an in memory bitmap corresponding to a block to which the first block pointer points; and determining whether a system bitmap has a corresponding bit set in the position.

25. The computer-readable storage medium of claim 19, wherein the process further comprises:

adding the first block pointer to a fetch list if the first block pointer is an indirect pointer and the first block pointer is not present in an in-memory cache; and testing a next entry on the list.

26. A method of block allocation testing in a data storage system, the method comprising:

identifying, by a server, a first family of volumes in a storage pool, wherein each volume in the first family except a most downstream volume has been cloned from another volume in the first family, each volume in the first family containing a plurality of inodes, each of the inodes containing one or more block pointers; and testing the volumes in the first family to determine whether block pointers satisfy a predetermined criterion for evaluation of correctness, by successively comparing corresponding block pointers in corresponding ones of the inodes in neighboring pairs of volumes in the first family, such that each volume in the first family is tested against at least one neighboring volume in the first family, wherein each said neighboring pair of volumes includes a first volume and a second volume immediately downstream from the first volume.

27. A method as recited in claim 26, wherein said testing the volumes in the first family is done by successively testing different pairs of neighboring volumes in the first family starting from a most downstream pair to a most upstream pair.

28. A method as recited in claim 26, wherein each of the inodes relates to a particular file in the volume that contains the inode, and wherein each of the inodes contains metadata about said particular file.

29. A method as recited in claim 26, further comprising:
    modifying any of said block pointers which are determined not to satisfy the predetermined criterion, to satisfy the predetermined criterion.

30. A method as recited in claim 26, further comprising:
    performing said testing simultaneously for a plurality of pairs of corresponding inodes.

31. A method as recited in claim 26, further comprising:
    performing said method for a second family of volumes simultaneously with performing said method for said first family of volumes.

32. A method as recited in claim 26, wherein testing the volumes in the first family comprises:
    determining whether a copy on write indicator associated with each of a plurality of block pointers is correct, in a volume of the first family of volumes.

33. A method as recited in claim 26, wherein testing the volumes in the first family comprises:
    determining whether illegal cross-linking of data blocks exists in a volume of the first family of volumes.

34. A method as recited in claim 26, wherein testing the volumes in the first family comprises:
    determining whether a copy on write indicator associated with each of a plurality of block pointers is correct, in a volume of the first family of volumes; and
    determining whether illegal cross-linking of data blocks exists in said volume.

35. A method comprising:
    selecting, by a server, a first volume and second volume of a file system, wherein second volume is a clone of the first volume;
    traversing a plurality of block pointers inside the first volume and a corresponding plurality of block pointers inside the second volume; and
    clearing a copy on write indicator, for each block pointer inside the second volume, if the copy on write indicator is improperly set, wherein the copy on write indicator is improperly set if any of the following are true:
        the block pointer inside the second volume contains a value that indicates that the block pointer is unused,
        no block pointer inside the first volume corresponds to the block pointer inside the second volume,
        a block pointer inside the first volume corresponds to the block pointer inside the second volume and the set of corresponding block pointers reference different blocks.

* * * * *